United States Patent [19]

Seki et al.

[11] 4,028,435

[45] June 7, 1977

[54] PROCESS FOR PRODUCING BLOCK COPOLYMERS

[75] Inventors: Kenji Seki; Akio Kimura; Satoshi Asahi, all of Sodegaura; Yasuhiro Takeshita, Ichihara, all of Japan

[73] Assignee: Idemitsu Kosan Co., Ltd., Tokyo, Japan

[22] Filed: Sept. 20, 1976

[21] Appl. No.: 724,969

[30] Foreign Application Priority Data

Sept. 23, 1975 Japan .............................. 50-114340
Sept. 26, 1975 Japan .............................. 50-115521

[52] U.S. Cl. ................................................ 260/878 B
[51] Int. Cl.$^2$ ............... C08F 295/00; C08F 297/08
[58] Field of Search ................................ 260/878 B

[56] References Cited

UNITED STATES PATENTS

| 3,458,598 | 7/1969 | Craven ............................ 260/878 B |
| 3,652,724 | 3/1972 | Shimomura et al. ............ 260/878 B |
| 3,692,712 | 9/1972 | Crouch et al. .................. 260/878 B |
| 3,699,190 | 10/1972 | Shimomura ..................... 260/878 B |
| 3,734,978 | 5/1973 | Schwab ........................... 260/878 B |
| 3,739,042 | 6/1973 | Chu et al. ....................... 260/878 B |
| 3,800,007 | 3/1974 | Bafford .......................... 260/878 B |
| 3,851,015 | 11/1974 | Agouri et al. ................... 260/878 B |
| 3,887,650 | 6/1975 | Agouri et al. ................... 260/878 B |
| 3,949,016 | 4/1976 | Agouri et al. ................... 260/878 B |

*Primary Examiner*—Alan Holler
*Attorney, Agent, or Firm*—Flynn & Frishauf

[57] ABSTRACT

Block copolymers of (i) a polymer of ethylene or propylene, or copolymer of ethylene or propylene with another α-olefin and (ii) a polymer of an acrylic ester or a methacrylic ester are formed by polymerizing (i) in the presence of a titanium halide and an organic aluminum compound, and then adding in order (a), (b) and (c) to copolymerize a product so obtained with (a) an acrylic ester or a methacrylic ester, in the presence of (b) an organic phosphorus compound or tertiary amine and (c) a benzyl halide, a ring-alkylated benzyl halide, a benzyl halide in which a methylene hydrogen is replaced with an alkyl or aryl group, or an alkyl halide.

16 Claims, No Drawings

PROCESS FOR PRODUCING BLOCK COPOLYMERS

FIELD OF THE INVENTION

This invention relates to a process for producing block copolymers and, more particularly, it relates to a process for producing block copolymers which are composed of a polymer of ethylene or propylene, or their copolymer with another α-olefin, and a polymer of an acrylic ester, or a methacrylic ester.

BACKGROUND OF THE INVENTION

Block copolymers of a polyolefin and a polymer of a vinyl compound possess desirable properties of polyolefins and furthermore are expected to improve dye-affinity, hydrophilicity and miscibility with other resins. Thus, various processes for producing the block copolymers have been proposed. For example, one process comprises polymerizing olefins in the presence of a stereospecific catalyst, and thereafter polymerizing vinyl compounds in the presence of an alkylene oxide (Japanese Patent Publication Gazette No. 8679/1969). However, by this process, an alkylene oxide may be incorporated into the copolymer and thus this process is not advantageous. Another process comprises polymerizing olefins using an anionic catalyst and blockcopolymerizing vinyl compounds in the presence of a radical initiator (Japanese Patent Publication Gazette Nos. 40055/1970 and 42385/1972). However, upon using a radical initiator, substantial amounts of homopolymers of vinyl compounds are produced as by-products and thus this process is also not advantageous.

We have found that block copolymers can be prepared very efficiently from a polymer of ethylene or propylene or their copolymers, with another α-olefin, and a polymer of an acrylic ester or a methacrylic ester, by adding certain organic phosphorus compounds or tertiary amines and organic halides to specific catalyst systems for polymerization of said olefins described above. Thus, the present invention was achieved.

SUMMARY OF THE INVENTION

In accordance with the present invention, there is provided a process for producing block copolymers comprised of a polymer of ethylene or propylene or copolymers thereof, with another α-olefin, and a polymer of an acrylic ester or a methacrylic ester, which comprises polymerizing ethylene or propylene or copolymerizing them, with another α-olefin having from 2 to 7 carbon atoms in the presence of an organic aluminum compound represented by the formula $AlR_nX_{3-n}$, wherein R is an alkyl group having from 1 to 5 carbon atoms, X is halogen and $n$ is an integer from 1 to 3, and titanium halide as a catalyst, to form a polymer or copolymer, and subsequently adding in order (a) an acrylic ester or a methacrylic ester, (b) an organic phosphorus compound or a tertiary amine, and (c) benzyl halide or a derivative thereof, or an alkyl halide, to copolymerize (a) with the polymer or copolymer first formed.

DETAILED DESCRIPTION OF THE INVENTION

The process of the present invention comprises two steps, that is, the first step is for polymerization of an olefin or olefins, and the second step is for block copolymerization of the polyolefin thus obtained and an acrylic ester or a methacrylic ester.

In the first step, ethylene or propylene is normally polymerized or copolymerized with an α-olefin in a hydrocarbon solvent in the presence of an organic aluminum compound and a titanium halide under atmospheric pressure or medium to low pressure. Example of α-olefins having from 2 to 7 carbon atoms which are copolymerized with ethylene or propylene are ethylene, propylene, butene-1, pentene-1, 3-methyl butene-1, hexene-1, 4-methyl pentene-1, 3-ethyl butene-1, heptene-1, 4,4-dimethyl pentene-1 and 3,3-dimethyl butene-1. Copolymerization of ethylene or propylene with the above-described olefin can be done by random copolymerization or block copolymerization procedures. As to hydrocarbon solvents for polymerization, aliphatic hydrocarbons such as pentane, hexane, heptane, octane; alicyclic hydrocarbons such as cyclopentane, cyclohexane, methylcyclohexane; and aromatic hydrocarbons such as benzene, toluene, xylene are preferred examples.

Two-component catalysts comprising an organic aluminum compound and a titanium halide are used for polymerization of the olefins described above. One component of the catalyst, an organic aluminum compound, is indicated by the above-described formula. When $n$ is 2 or 3, alkyl groups are not necessarily the same. Among such compounds, trialkyl aluminums of short straight chain aliphatic alkyl groups such as trimethyl aluminum $Al(CH_3)_3$, triethyl aluminum $Al(C_2H_5)_3$, tri-n-propyl aluminum $Al(C_3H_7)_3$ are preferred examples, and diethyl aluminum monochloride $Al(C_2H_5)_2Cl$, ethyl aluminum dichloride $Al(C_2H_5)Cl_2$ can also be used advantageously. Preferred examples of titanium halides, which comprise the other component of the catalyst for polymerization of olefins, are titanium tetrachloride, titanium trichloride and titanium dichloride. Titanium halides containing aluminum such as AA-type $TiCl_3$, i.e. Aluminum activated $TiCl_3$ can also be used effectively.

The molar ratio of organic aluminum compound to titanium halide is from 0.6 to 5.0, preferably 1.0 to 3.0. The amount of mixed catalyst of organic aluminum compound and titanium halide is not restrictive and is sufficient in an ordinary catalytic amount. Generally, the molar ration of titanium : ethylene or propylene or sum of ethylene or propylene and another α-olefin is 1 : 10 – 100,000, preferably 1 : 500 – 20,000.

Polymerization or copolymerization can be done by blowing ethylene or propylene singly or in combination with another α-olefin under atmospheric pressure; when under pressurized conditions, at most 50 atmospheres of pressure are required. Under these conditions, polymerization or copolymerization is achieved by reacting for 0.5 to 2 hours at a temperature of from 30° to 100° C, preferably at 50° to 80° C, and thus a partially inactivated polyolefin and a polyolefin having active terminal group are obtained.

In the said second step, a block copolymer is prepared by adding, in the following order, (a) an acrylic ester or a methacrylic ester, (b) an organic phosphorus compound or a tertiary amine and (c) a benzyl halide or a derivative thereof or an alkyl halide to a polyolefin described above. Additive (a) is the starting material for formation of the desired block copolymer. On the other hand, additives (b) and (c) are used as catalysts for effecting copolymerization efficiently. When the order of addition of (a), (b) and (c) is altered from the above-described method, the yield of block copolymer is lowered greatly.

Preferred examples of additive (a) include such acrylic esters as methyl acrylate, ethyl acrylate, propyl acrylate, butyl acrylate, 2-ethylhexyl acrylate, 2-ethoxyethyl acrylate, ethyleneglycol ester of acrylic acid, 1,3-propanediol ester of acrylic acid and 1,4-butanediol ester of acrylic acid. Methyl methacrylate is the best example of an ester of methacrylic acid, but ethyl methacrylate, propyl methacrylate, butyl methacrylate, 2-ethylhexyl methacrylate, cyclohexyl methacrylate, octyl methacrylate, benzyl methacrylate and alkylene glycol monomethacrylic esters, in which the number of carbon atoms present in the alkylene glycol group is from 2 to 5, are also advantageous. Examples of alkylene glycol mono-methacrylic ester are 2-hydroxyethyl methacrylate, 1-hydroxyethyl methacrylate, 3-hydroxypropyl methacrylate, 2-hydroxypropyl methacrylate, 4-hydroxybutyl methacrylate, 3-hydroxybutyl methacrylate, 2-hydroxybutyl methacrylate, 2-hydroxy-2-methylpropyl methacrylate and 1-hydroxy-2,2-dimethylpropyl methacrylate.

Amounts of an ester of an acrylate or a methacrylate are not restrictive and can be varied suitably. Generally, the molar ratio of this compound to olefin is 0.01 to 10.

Either an organic phosphorus compound or a tertiary amine is employed as additive (b). Examples of organic phosphorus compounds are: phosphines such as triethyl phosphine, tri-n-propyl phosphine, tri-n-butyl phosphine and triphenyl phosphine; phosphites such as trimethyl phosphite, triethyl phosphite and tri-n-butyl phosphite; phosphates such as trimethyl phosphate, triethyl phosphate and tri-n-butyl phosphate; phosphoramides such as hexamethyl phosphoramide. Organic phosphorus compounds described above are used singly or in combination. On the other hand, examples of tertiary amines are aliphatic tertiary amines such as triethyl amine, tri-n-propyl amine, tributyl amine, triamyl amine and trioctyl amine; amines with an unsaturated group such as triallyl amine; aromatic amines such as dimethyl aniline, diethyl aniline, toluidine and methyl diphenyl amine; tetramethyl ethylenediamine and 1,8-diaza-bicyclo-[5,4,0] undecene-7 or its phenolate, caproate or oleate. The present invention cannot be achieved by using primary or secondary amines.

Examples of additive (c) include: benzyl halides such as benzyl chloride and benzyl bromide; their derivatives such as nuclear substitution products of benzyl halide with an alkyl group or groups, for example p-methylbenzyl chloride; substitution products of hydrogen other than on the benzene ring with an alkyl or an aryl group or groups, for example diphenylchloromethane; and alkyl halides such as carbon tetrachloride, chloroform, methylene chloride and t-butyl chloride.

Amounts of additive (b) are from 0.5 to 50 by molar ratio, preferably 1.0 to 30, to titanium halide. Additive (c) is employed in an amount of from 0.1 to 5.0 by molar ratio, preferably 0.3 to 3.0. to organic phosphorus compound or tertiary amine.

Under the above conditions, the desired block copolymers can be obtained by polymerizing at a temperature of from 30° to 100° C, preferably 50° to 80° C, for from 0.5 to 5 hours.

According to the present invention, an acrylic ester or a methacrylic ester can be block polymerized with a polyolefin very efficiently.

As described above, a copolymer obtained by the process of the present invention comprises a mixture of a small amount of inactivated olefin homopolymer, which is the product of the first step, the desired block copolymer and a small amount of homopolymer of an acrylic ester or a methacrylic ester. The mixture contains very low amounts of homopolymer, especially of acrylic ester or methacrylic ester compared with those produced by conventional methods. Therefore, the copolymers produced by this invention can be used as varius molding materials, composition compounds or starting material for paints, building materials, synthetic fiber paper, etc., without a further separation process. When an alkylene glycol mono-methacrylic ester is used as an example of an methacrylic ester, the block copolymer obtained is excellent in weatherproofing, hydrophilicity, adhesiveness and softness properties due to having an active hydroxy group therein.

The invention is explained in detail by means of the following illustrative examples and compartive examples.

EXAMPLE 1

To a 500 ml content flask the atmosphere of which is displaced with argon, 250 ml. of purified n-heptane were placed as a solvent and then under a stream of argon, 0.5 millimole of 3 $TiCl_3AlCl_3$ and 1 millimole of triethyl aluminum were added to form a catalyst for ethylene polymerization. Ethylene was blown through the mixture under normal pressure and polymerization was made at 70° C for 1 hour with agitation and subsequently ethylene was displaced with argon and argon was bubbled for 5 minutes. By this process, unreacted ethylene monomer other than dissolved in the solvent was removed, and then under the stream of argon 10 grams of methyl methacrylate (designated as MMA hereafter), 6.0 millimoles of tri-n-butyl phosphine and 6.0 millinoles of benzyl bromide were added in this order and polymerization was continued for another 3 hours. After the reaction, the catalyst was decomposed by adding small amounts of methanol and then a large amount of methanol was added to precipitate the polymer which had formed. The polymer was filtered and dried under reduced pressure. The polymer obtained was 21.7 grams and material extracted with hot acetone, which is considered to be a homopolymer of MMA, was only 0.9 weight percent. From the results of IR absorption spectrum, 38.7 % of MMA units were found to be present in the portion of copolymers insoluble in acetone. The conversion yield of MMA to homopolymer and copolymer was 85.2%.

EXAMPLE 2

This experiment was carried out in the same manner as described in Example 1, except that 6 millimoles of benzyl bromide were replaced by 6 millimoles of benzyl chloride. As a result, the amount of product was 16.4 grams; the acetone-soluble part was 0.3%. In the acetone-insoluble copolymer, 13.0% of MMA units were found to be present. The conversion yield of MMA to homopolymer and copolymer was 21.7%.

EXAMPLE 3

This experiment was carried out in the same manner as described in Example 1, except that 6 millimoles of benzyl bromide were replaced by 6 millimoles of carbon tetrachloride. As a result, the amount of product was 20.8 grams; the acetone-soluble material was 0.3%. In the acetone-insoluble copolymer, 9.1% of MMA units were found to be present. The conversion yield of MMA to homopolymer and copolymer was 19.5%.

EXAMPLE 4

This experiment was carried out in the same manner as Example 1, except that 6 millimoles of benzyl bromide were replaced by 6 millimoles of t-butyl chloride. As a result, the amount of product was 16.2 grams; the acetone-soluble part was 0.3%. In the acetone-insoluble copolymer, 1.0% of MMA units were found to be present. The conversion yield of MMA to homopolymer and copolymer was 2.1%.

EXAMPLE 5

This experiment was carried out in the same manner as Example 1, except that 6 millimoles of tri-n-butyl phosphine were replaced by 6 millimoles of triethyl phosphite and 6 millimoles of benzyl bromide were replaced by 6 millimoles of benzyl chloride. As a result, the amount of product was 13.2 grams; the acetone-soluble part was 0.2%. In the acetone-insoluble copolymer, 4.8% of MMA units were found to be present. The conversion yield of MMA to homopolymer and copolymer was 6.6%.

EXAMPLE 6

This experiment was carried out in the same manner as described in Example 5, except that 6 millimoles of benzyl chloride were replaced by 6 millimoles of carbon tetrachloride. As a result, the amount of the product was 16.4 grams; the acetone-soluble part was 0.9%. In the acetone-insoluble copolymer, 6.5% of MMA units were found to be present. The conversion yield of MMA to homopolymer and copolymer was 12.0%.

EXAMPLE 7

This experiment was carried out in the same manner as described in Example 1, except that 1 millimole of triethyl aluminum was replaced by 1 millimole of diethyl aluminum monochloride. As a result, the amount of the product was 19.3 grams; the acetone-soluble part was 13.6%. In the acetone-insoluble polymer, 42.8 weight percent of MMA units were found to be present.

EXAMPLE 8

This experiment was carried out in the same manner as Example 1, except that 10 grams of MMA were replaced by 10 grams of methyl acrylate. As a result, the amount of the product was 17.9 grams; the acetone-soluble part occupied 2.1%. In the acetone-insoluble copolymer, 30.6% of methyl acrylate units were found to be present.

EXAMPLE 9

To a 500 ml flask the atmosphere of which is displaced by argon, 100 ml of purified n-heptane were placed as a solvent and then under the stream of argon 0.5 millimole of 3 $TiCl_3$—$AlCl_3$ and 1.0 millimole of triethyl aluminum were added to form the catalyst for ethylene polymerization. Ethylene was blown through the mixture under normal pressure and polymerization was made for 1 hour at 70° C with agitation. Subsequently, ethylene was displaced by argon and argon was bubbled for 5 minutes. By this process, unreacted ethylene monomer other than that dissolved in the solvent was removed, and then under the stream of argon 6 grams of MMA, 2 millimoles of hexamethyl phosphoramide and 2 millimoles of carbon tetrachloride were added in this order and polymerization was continued for another 2 hours at 70° C. After polymerization, the catalyst was decomposed by adding small amounts of methanol, and then a large amount of methanol was added to precipitate copolymer which had formed. The polymer obtained was filtered and dried under reduced pressure. The polymer obtained was 9.7 grams; no acetone-soluble part was present. In the acetone-insoluble copolymer, 2.9% of MMA units were found to be present.

COMPARATIVE EXAMPLE 1

This experiment was carried out in the same manner as described in Example 1, except that benzyl bromide was not added. As a result, the amount of product was 15.5 grams. The acetone-soluble part was 0.3%. However, in the acetone-insoluble polymer almost no MMA unit was found.

COMPARATIVE EXAMPLE 2

This experiment was carried out in the same manner as Example 5, except that triethyl phosphite was not added. As a result, the amount of the product was 19.2 grams. The acetone-soluble part was 0.1%. In the acetone-insoluble polymer, no MMA unit was found to be present.

COMPARATIVE EXAMPLE 3

This experiment was carried out in the same manner as Example 1, except that tri-n-butylphosphine and benzyl bromide were not added. As a result, the amount of product was 17.4 grams. The acetone-soluble part was 0.3%. In the acetone-insoluble polymer, no MMA unit was found to be present.

EXAMPLE 10

A five-necked flask (500 ml content) with inlet for gas, cooler, thermometer, agitator and opening for pouring reagents was displaced by argon. Under the stream of argon, 250 milliliters of n-heptane as a solvent were added through a syringe, and then 0.5 millimole of AA-type titanium chloride and 1 millimole of triethyl aluminum were added. While introducing a small amount of argon, the temperature was raised to 70° C with stirring, and then argon was replaced by ethylene which was introduced at the rate of 500 cubiic centimeter per minute, and polymerization was made for 1 hour. After the reaction, ethylene was displaced by argon and argon was bubbled for 5 minutes. By this process, unreacted ethylene was discharged from the flask. Subsequently, under the stream of argon 10 grams of butyl acrylate, 6 millimoles of triethyl amine and 6 millimoles of benzyl chloride were added in this order, and the polymerization was continued for 3 hours at 70° C. After the reaction, the catalyst was decomposed by adding a small amount of methanol and then a large amount of methanol was added to precipitate polymer which had formed. The polymer was filtered and dried under reduced pressure. The polymer obtained was 29 grams. A part (3 grams) was weighed exactly and was extracted with boiling acetone using a Soxhlet extractor for 8 hours. The residues were examined by IR absorption spectroscopy. As a result, the content of homopolymer of butyl acrylate in the polymer formed was 0.7 weight percent, and the content of butyl acrylate units in the block copolymer was 0.3 weight percent.

EXAMPLE 11

This experiment was carried out in the same manner as described in Example 10, except that 6 millimoles of benzyl chloride were replaced by 6 millimoles of carbon tetrachloride. As a result, the amount of polymer obtained was 26 grams. The content of homopolymer of butyl acrylate in the polymer was 1.7 weight percent. The content of butyl acrylate unit in the block copolymer was 1.8 weight percent.

EXAMPLE 12

This experiment was carried out in the same manner as Example 10, except that 10 grams of butyl acrylate was replaced by 10 grams of methyl acrylate. As a result, the amount of polymer obtained was 17.3 grams. The content of the homopolymer of methyl acrylate was 0.6 weight percent. The content of methyl acrylate unit in the block copolymer was 3.9 weight percent. The conversion yield of methyl acrylate to homopolymer of methyl acrylate and the block copolymer was 7.7%.

EXAMPLE 13

This experiment was carried out in the same manner as Example 12, except that 6 millimoles of benzyl chloride were replaced by 6 millimoles of carbon tetrachloride. As a result, the amount of polymer obtained was 21.4 grams. The content of the homopolymer of methyl acrylate in the polymer formed was 1.0 weight percent. The content of methyl acrylate unit in the block copolymer was 19.4 weight percent. The conversion yield of methyl acrylate to homopolymer of methyl acrylate and the block copolymer was 43.2%.

COMPARATIVE EXAMPLE 4

This experiment was carried out in the same manner as described in Example 12, except that triethyl amine and benzyl chloride were not added. As a result, the amount of polymer obtained was 14.3 grams. The content of the homopolymer of methyl acrylate in the polymer formed was very small (0.4 weight percent). However, the content of methyl acrylate unit in the block copolymer was less than 0.1 weight percent.

EXAMPLE 14

A five-necked flask (500 ml content) with inlet for introduction of gas, cooler, thermometer, agitator and opening for pouring reagents was displaced by argon. Under the stream of argon, 250 milliliters of n-heptane as a solvent were added through a syringe, and then 0.5 millimole of AA-type titanium chloride and 1.0 millimole of triethyl aluminum were added. While introducing a small amount of argon, the temperature of the resulting mixture was raised to 70° C with stirring, and then argon was replaced by ethylene which was then introduced at the rate of 500 milliliters per minute, and polymerization was made for 1 hour. After the reaction, ethylene was displaced by argon and argon was bubbled for 5 minutes. By this process, unreacted ethylene was discharged from the flask. Subsequently, under the stream of argon, 10 grams of MMA, 6 millimoles of triethyl amine and 6 millimoles of benzyl chloride were added in this order, and the polymerization was continued for 3 hours at 70° C. After the reaction, the catalyst was decomposed by adding a small amount of methanol, and then a large amount of methanol was added to precipitate the polymer formed. The polymer was filtered and dried under reduced pressure. The polymer obtained was 21.7 grams. A part of the polymer (3 grams) was weighed exactly and was extracted with boiling acetone using a Soxhlet extractor for 8 hours. Results were as follows:

| Extract | MMA homopolymer* | 1.3 weight percent |
|---|---|---|
| Residues | Ethylene-MMA block copolymer + polyethylene | 98.7 weight percent |
| | Content of MMA in the residues | 35.1 weight percent |
| The conversion yield of MMA** | | 78.0 percent. |

*confirmed by IR absorption spectroscopy
**yield of MMA to MMA homopolymer and ethylene-MMA block copolymer

EXAMPLE 15

This experiment was carried out in the same manner as described in Example 14, except that triethyl amine was replaced by another aliphatic tertiary amine shown in Table 1. Results are provided in Table 1.

Table 1

| Amine | Polymer formed (grams) | Conversion yield of MMA (%) | MMA homopolymer (weight %) | Content of MMA in the residues (weight %) |
|---|---|---|---|---|
| $(CH_3CH_2CH_2)_3N$ | 18.4 | 22.3 | 0.7 | 11.5 |
| $(CH_3(CH_2)_4)_3N$ | 16.4 | 4.3 | 0.6 | 2.0 |
| $(CH_3(CH_2)_7)_3N$ | 22.6 | 13.9 | 0.5 | 5.7 |

EXAMPLE 16

This experiment was carried out in the same manner as Example 14, except that triethyl amine was replaced by an aromatic tertiary amine shown in Table 2. Results are provided in Table 2.

Table 2

| Amine | Polymer formed (grams) | Conversion yield of MMA (%) | MMA homopolymer (weight %) | Content of MMA in the residues (weight %) |
|---|---|---|---|---|
| 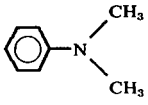 | 17.3 | 17.3 | 1.0 | 9.1 |

Table 2-continued

| Amine | Polymer formed (grams) | Conversion yield of MMA (%) | MMA homopolymer (weight %) | Content of MMA in the residues (weight %) |
|---|---|---|---|---|
| C₆H₅–N(CH₃)(C₂H₅) | 17.5 | 8.0 | 0.8 | 3.8 |
| CH₃–C₆H₄–N(CH₃)₂ | 18.3 | 4.2 | 0.3 | 2.0 |

EXAMPLE 17

This experiment was carried out in the same manner as Example 14, except that benzyl chloride was replaced by a derivative of benzyl halide shown in Table 3. Results are provided in Table 3.

Table 3

| Benzyl halide | Polymer formed (gramm) | Conversion yield of MMA (%) | MMA homopolymer (weight %) | Content of MMA in the residues (weight %) |
|---|---|---|---|---|
| C₆H₅–CH₂Br | 29.2 | 100 | 3.0 | 37.5 |
| CH₃–C₆H₄–CH₂Cl | 31.3 | 100 | 1.7 | 31.5 |
| C₆H₅–CHCl–C₆H₅ | 21.1 | 7.4 | 2.5 | 1.0 |

EXAMPLE 18

This experiment was carried out in the same manner as Example 14, except that amounts of triethyl amine and benzyl chloride were changed. Results are shown in Table 4.

Table 4

| Triethyl amine (milli moles) | Benzyl chloride (milli moles) | Polymer formed (gramm) | Conversion yield of MMA (%) | MMA homopolymer (weight %) | Content of MMA in the residues (weight %) |
|---|---|---|---|---|---|
| 2.0 | 1.0 | 17.1 | 19.6 | 0.8 | 10.7 |
| 2.0 | 2.0 | 18.0 | 13.9 | 0.8 | 17.9 |
| 2.0 | 6.0 | 17.3 | 5.7 | 0.4 | 2.9 |

COMPARATIVE EXAMPLE 5

This experiment was carried out in the same manner as Example 14, except that benzyl chloride was not added. Results are as follows.

| | |
|---|---|
| Polymer formed | 13.8 grams |
| Conversion yield of MMA | 0.6 percent |
| MMA homopolymer | 0.4 weight percent |
| Content of MMA in the residue | 0 percent. |

COMPARATIVE EXAMPLE 6

This experiment was carried out in the same manner as Example 14, except that triethyl amine was not added. Results are as follows.

| | |
|---|---|
| Polymer formed | 19.2 grams |
| Conversion yield of MMA | 0.2 percent |
| MMA homopolymer | 0.1 weight percent |
| Content of MMA in the residues | 0 percent. |

COMPARATIVE EXAMPLE 7

This experiment was carried out in the same manner as Example 14, except that triethyl amine and benzyl chloride were not added. Results are as follows.

| | |
|---|---|
| Polymer formed | 17.4 grams |
| Conversion yield of MMA | 0.5 percent |
| MMA homopolymer | 0.3 weight percent |
| Content of MMA in the residues | 0 percent. |

COMPARATIVE EXAMPLE 8

Inactivated polyethylene (10 grams) was placed in a 500 ml content five-necked flask, the atmosphere of which was displaced by argon (the same flask used in Example 14) and 250 milliliters of n-heptane were added to the flask. Furthermore, as a catalyst, 0.5 millimole of AA-type titanium chloride and 1.0 millimole of triethyl aluminum were added and the mixture was brought up to a temperature of 70° C. Subsequently, 10 grams of MMA, 6 millimoles of triethyl amine and 6 millimoles of benzyl chloride were added while stirring, and polymerization was effected for 4.5 hours at 70° C. After the completion of the reaction, a large amount of methanol was added to precipitate the polymer which was then filtered and dried under reduced pressure. The polymer thus obtained was analyzed by IR absorption spectroscopy. No absorption due to MMA was observed.

EXAMPLE 19

To a 500 ml content flask, the atmosphere of which was displaced by argon, 250 ml of purified n-heptane were placed as a solvent. Then, under the stream of argon, 0.5 millimole of 3 $TiCl_3$-$AlCl_3$ and 1 millimole of triethyl aluminum were added to form a catalyst for ethylene polymerization. Ethylene was blown through the mixture under normal pressure and polymerization was made for 1 hour at 70° C with stirring. Subsequently, ethylene was displaced by argon and argon was bubbled for 5 minutes. By this process, unreacted ethylene monomer other than that dissolved in the solvent was removed. Then, under the stream of argon, 10 grams of MMA, 6 millimoles of triethyl amine and 6 millimoles of carbon tetrachloride were added in this order, and polymerization was continued for another 3 hours. After polymerization, the catalyst was decomposed by adding a small amount of methanol, and then a large amount of methanol was added to precipitate the polymer formed. The polymer thus obtained was filtered and dried under reduced pressure. The amount of polymer was 25.7 grams. The hot acetone-soluble part which is considered to be homopolymer of methyl methacrylate comprised 1.9%. The content of MMA in the acetone-insoluble copolymer was found to be 36.7% by IR absorption spectroscopy.

EXAMPLE 20

This experiment was carried out in the same manner as described in Example 19, except that 6 millimoles of triethyl amine were replaced by 6 millimoles of tri-n-propyl amine. As a result, the amount of the polymer was 23.6 grams. The acetone-soluble part was 0.9%. The content of MMA in the acetone-insoluble copolymer was 26.5%.

EXAMPLE 21

This experiment was carried out in the same manner as Example 19, except that 6 millimoles of triethyl amine were replaced by 6 millimoles of dimethyl aniline. As a result, the amount of the product was 21.2 grams. The acetone-soluble part was 1.3%. The content of MMA in the acetone-insoluble copolymer was 4.6%.

EXAMPLE 22

This experiment was carried out in the same manner as described in Example 19, except that 6 millimoles of triethyl amine were replaced by 6 millimoles of tetramethyl ethylene diamine. As a result, the amount of the product was 17.1 grams. The actone-soluble part was 3.7%. the content of MMA in the acetone-insoluble copolymer was 22.5%.

EXAMPLE 23

This experiment was carried out in the same manner as Example 19, except that 6 millimoles of carbon tetrachloride were replaced by 6 millimoles of chloroform. As a result, the amount of the product was 18.7 grams. The acetone-soluble part was 0.7%. The content of MMA in the acetone-insoluble copolymer was 7.4%.

COMPARATIVE EXAMPLE 9

This experiment was carried out in the same manner as in Example 19, except that triethyl amine was not added. As a result, the amount of product was 18.6 grams. However, no MMA was found either in the acetone-soluble or acetone-insoluble polymers.

COMPARATIVE EXAMPLE 10

This experiment was carried out in the same manner as Example 19, except that carbon tetrachloride was not added. As a result, the amount of the product was 19.2 grams. However, no MMA was found in the product.

COMPARATIVE EXAMPLE 11

This experiment was carried out in the same manner as Example 19, except that triethyl amine and carbon tetrachloride were not added. As a result, the amount of the product was 17.4 grams. However, no MMA was found in the product.

EXAMPLE 24

A five-necked flask (500 ml content) with inlet for introduction of gas, cooler, thermometer, agitator and opening for pouring reagents was displaced with argon. Under the stream of argon, 250 milliliters of n-heptane as a solvent were added through a syringe, and then 0.5 millimole of AA-type titanium chloride and 1 millimole of triethyl aluminum were added. While introducing a small amount of argon, the temperature was raised to 70° C with stirring. Then, argon was replaced by ethylene which was then introduced at the rate of 500 milliliters per minute, and polymerization was made for 1 hour. After the reaction, ethylene was displaced by argon, and argon was introduced for 5 minutes. By this process, unreacted ethylene was discharged from the flask. Subsequently, under the stream of argon, 10 grams of 2-hydroxyethyl methacrylate, 6 millimoles of triethyl amine and 6 millimoles of benzyl chloride were added in this order, and polymerization was continued for 3 hours at 70° C. After the reaction, the catalyst was decomposed by adding a small amount of methanol, and then a large amount of methanol was added to precipitate the polymer formed. The polymer was filtered and dried under reduced pressure. The polymer obtained was 24.6 grams. A part of the polymer (3 grams) was weighed exactly and was extracted with boiling acetone using a Soxhlet extractor for 8 hours. The residues were examined by IR absorption spectroscopy. As a result, the content of 2-hydroxyethyl methacrylate homopolymer in the product was 4.3 weight percent; the content of 2-hydroxyethyl methacrylate unit in the block copolymer was 33.3 weight percent. The conversion yield of 2-hydroxyethyl methacrylate to homopolymer and block copolymer was 89%.

EXAMPLE 25

This experiment was carried out in the same manner as described in Example 24, except that 6 millimoles of benzyl chloride were replaced by 6 millimoles of carbon tetrachloride. As a result, the amount of the product was 24.4 grams. The content of 2-hydroxyethyl methacrylate homopolymer in the polymer obtained was 3.6 weight percent. The content of 2-hydroxyethyl methacrylate unit in the block copolymer was 44.4 weight percent. The conversion yield of 2-hydroxyethyl methacrylate to homopolymer and block copolymer was 100%.

EXAMPLE 26

This experiment was carried out in the same manner as Example 24, except that the polymerization temperature for 2-hydroxyethyl methacrylate was set at 50° C. As a result, the amount of the polymer was 21 grams. The content of 2-hydroxyethyl methacrylate homopolymer in the polymer obtained was 2.0 weight percent. The content of 2-hydroxyethyl methacrylate unit in the block copolymer was 40.8 weight percent. The conversion yield of 2-hydroxyethyl methacrylate to homopolymer and block copolymer was 88.2%.

EXAMPLE 27

This experiment was carried out in the same manner as described in Example 24, except that 2-hydroxyethyl methacrylate was replaced by 2-hydroxypropyl methacrylate. As a result, the amount of polymer obtained was 32.6 grams. The content of 2-hydroxypropyl methacrylate homopolymer in the polymer obtained was 2.7 weight percent. The content of 2-hydroxypropyl methacrylate unit in the block copolymer was 11.0 weight percent.

EXAMPLE 28

This experiment was carried out in the same manner as Example 27, except that benzyl chloride was replaced by carbon tetrachloride. As a result, the amount of polymer obtained was 34.3 grams. The content of 2-hydroxypropyl methacrylate homopolymer in the polymer obtained was 4.5 weight percent. The content of 2-hydroxypropyl methacrylate unit in the block copolymer was 9.7 weight percent.

COMPARATIVE EXAMPLE 12

This experiment was carried out in the same manner as Example 26, except that triethyl amine and benzyl chloride were not added. As a result, the amount of polymer obtained was 13.0 grams. The content of 2-hydroxyethyl methacrylate homopolymer in the polymer obtained was 0.6 weight percent. The content of 2-hydroxyethyl methacrylate unit in the block copolymer was 4.3 weight percent. The conversion yield of 2-hydroxyethyl methacrylate to homopolymer and block copolymer was 6.3%.

EXAMPLES 29–35

A five-necked flask (500 ml content) with inlet for introducing gas, cooler, thermometer, agitator and opening for pouring reagents was displaced by argon. Under the stream of argon, 250 milliliters of n-heptane as a solvent were added through a syringe, and then 0.5 millimole of AA-type titanium chloride and 1 millimole of triethyl aluminum were added. While introducing a small amount of argon, temperature was raised to 70° C with stirring. Then argon was replaced by ethylene, which was then introduced at the rate of 500 milliliters per minute, and polymerization was carried out for 1 hour. After the reaction, ethylene was displaced by argon, and argon was introduced for 5 minutes. By this process, unreacted ethylene was discharged from the flask. Subsequently, under the stream of argon, 10 grams of prescribed additive (a), 6 millimoles of prescribed additive (b) and 6 millimoles of prescribed additive (c) were added in this order, and polymerization was made for 3 hours at 70° C. After the reaction, the catalyst was decomposed by adding a small amount of methanol, and then a large amount of methanol was added to precipitate the polymer formed. The polymer was filtered and dried under reduced pressure. A part of the polymer (3 grams) was weighed exactly and was extracted with boiling acetone using a Soxhlet extractor for 8 hours. The residues were examined by IR absorption spectroscopy. Results are shown in Table 5.

Table 5

| No. | Additive (a) | Additive (b) | Additive (c) | Yield (grams) | Amount of homopolymer of Additive (a) in the produced polymer (weight %) | Content of Additive (a) in the block-copolymer (weight %) | Conversion Yield* of Additive (a) (%) |
|---|---|---|---|---|---|---|---|
| 1 | methyl methacrylate | DBU** | benzyl chloride | 42 | 0.4 | 1.5 | — |
| 2 | " | " | carbon tetrachloride | 28 | 0.7 | 1.3 | — |
| 3 | butyl acrylate | " | benzyl chloride | 25 | 0.4 | 0.3 | — |
| 4 | methyl methacrylate | DBU phenolate*** | " | 12 | 0.5 | 5.7 | — |
| 5 | " | DBU 2-ethyl caproate**** | " | 36 | 0.3 | 1.3 | — |
| 6 | " | DBU | " | 22.4 | 1.0 | 13.0 | 31.1 |
| 7 | " | " | carbon tetrachloride | 15.0 | 2.6 | 13.8 | 24.1 |

*Total conversion yield to homopolymer and block copolymer

**1,8-diaza-bicyclo[5,4,0] undecene-7 of the formula: 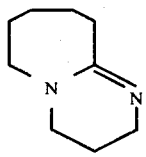

Table 5-continued

| No. | Additive (a) | Additive (b) | Additive (c) | Yield (grams) | Amount of homopolymer of Additive (a) in the produced polymer (weight %) | Content of Additive (a) in the block-copolymer (weight %) | Conversion Yield* of Additive (a) (%) |
|---|---|---|---|---|---|---|---|

***its chemical formula is as follow: 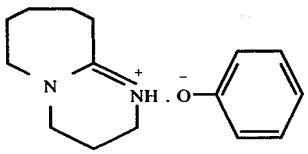

****its chemical formula is as follow: 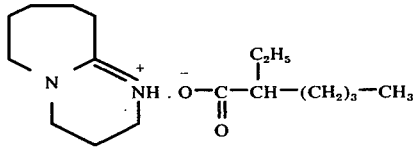

EXAMPLE 36 a pressure resistant glass autoclave (300 ml content) was displaced with argon. Under the stream of argon, 200 milliliters of n-heptane as a solvent, 0.5 gram of titanium trichloride and 6.0 millimoles of diethyl aluminum monochloride were added through a syringe.

Propylene was blown into the resulting mixture under a pressure of 3 kg/cm², and polymerization was made at 70° C for 1 hour. Subsequently, argon was bubbled in for 10 minutes in order to remove unreacted propylene monomer from the autoclave. Then, under the stream of argon, 10 grams of MMA, 6.0 millimoles of tri-n-butyl phosphine and 6.0 millimoles of benzyl bromide were added in this order, and polymerization was done at 70° C. for 1.5 hours. After the reaction, the catalyst was decomposed by adding a small amount of methanol and then a large amount of methanol to precipitate the polymer formed. The polymer was filtered and dried under reduced pressure. The thus-obtained polymer was 22.5 grams. A part (3 grams) was weighted exactly and was extracted with boiling acetone using a Soxhlet extractor for 8 hours. The residues were examined by IR absorption spectroscopy. As a result, the content of homopolymer of methyl methacrylate in the polymer formed was 5.0 weight percent, and the content of methyl methacrylate units in the block copolymer was 0.5 weight percent.

EXAMPLE 37

This experiment waas carried out in the same manner as described in Example 36, except that benzyl chloride was replaced by carbon tetrachloride. As a result, the amount of polymer obtained was 24.1 grams, and the content of homopolymer of methyl methacrylate in the polymer was 2.6 weight percent. The content of methyl methacrylate units in the block copolymer was 0.3 weight percent.

EXAMPLE 38

An autoclave (1000 ml content) was displaced with argon. Under the stream of argon, 400 milliliters of n-heptane as a solvent, 4.0 millimoles of titanium trichloride and 6.0 millimoles of diethyl aluminum monochloride were added through a syringe. Maintaining the temperature at 80° C, hydrogen was introduced into the autoclave at a pressure of 4 kg/cm². Then, 5 grams of hexene-1 were introduced from a pressure resistant glass bomb into the autoclave, and ethylene was added to make the pressure of the reaction system 8 kg/cm². Copolymerization reaction was done for 2 hours.

Thereafter, argon was bubbled for 10 minutes in order to remove unreacted ethylene and hexene-1 from the autoclave. Then, under the stream of argon, 50 grams of methyl methacrylate, 6.0 millimoles of triethyl amine and 6.0 millimoles of carbon tetrachloride were added in this order, and polymerization was done at 80° C for 2 hours. After the reaction, the catalyst was decomposed by adding a small amount of methanol and then a large amount of methanol to precipitate the polymer formed. The polymer was filtered and dried under reduced pressure. The thus-obtained polymer was 228 grams. A part (3 grams) was weighed exactly and was extracted with boiling acetone using a Soxhlet extractor for 8 hours. The residues were examined by IR absorption spectroscopy. As a result, the content of homopolymer of methyl methacrylate in the polymer formed was 1.3 weight percent, and the content of methyl methacrylate units in the block copolymer was 14.5 weight 1 Further, the content of hexene-1 in the poly-α-olefin chain was 0.28 mole percent.

What is claimed is:

1. A process for producing a block copolymer of (i) a polymer of ethylene or propylene, or a copolymer of ethylene or propylene with another α-olefin, and (ii) a polymer of an acrylic ester or a methacrylic ester, which comprises polymerizing ethylene or propylene, or copolymerizing them, with another α-olefin having from 2 to 7 carbon atoms in the presence of catalytic amounts of titanium halide and an organic aluminum compound of the formula $AlR_nX_{3-n}$ wherein R is an alkyl group having from 1 to 5 carbon atoms, X is a halogen and n is a integer of from 1 to 3, adding in order (a), (b) and (c) to a polymeric product so obtained and copolymerizing therewith (a) an acrylic ester or a methacrylic ester, in the presence of (b) an organic phosphorus compound or a tertiary amine, and (c) a benzyl halide, a ring-alkylated benzyl halide, a benzyl halide in which a methylene hydrogen is replaced with an alkyl or aryl group, or an alkyl halide.

2. Process according to claim 1, wherein said α-olefin having from 2 to 7 carbon atoms is selected from the group consisting of ethylene, propylene, butene-1, pentene-1, 3-methyl butene-1, hexene-1, 4-methyl pentene-1, 3-ethyl butene-1, heptene-1, 4,4-dimethyl pentene-1 and 3,3-dimethyl butene-1.

3. Process according to claim 1, wherein the methacrylic ester is an alkylene glycol mono-methacrylic ester.

4. Process according to claim 3, wherein the alkylene glycol mono-methacrylic ester is 2-hydroxyethyl methacrylate.

5. Process according to claim 1, wherein the methacrylic ester is methyl methacrylate.

6. Process according to claim 1, wherein the organic aluminum compound is a trialkyl aluminum having short straight chain aliphatic alkyl groups.

7. Process according to claim 6, wherein the trialkyl aluminum of short straight chain aliphatic alkyl groups is triethyl aluminum.

8. Process according to claim 1, wherein the titanium halide is selected from the group consisting of titanium tetrachloride, titanium trichloride and titanium dichloride.

9. Process according to claim 1, wherein the organic phosphorus compound is a member selected from the group consisting of a phosphine, phosphite, phosphate, phosphoramide and mixtures thereof.

10. Process according to claim 1, wherein the tertiary amine is 1,8-diaza-bicyclo-5,4,0] undecene-7 or its phenolate, caproate or oleate.

11. Process according to claim 1, wherein the tertiary amine is triethyl amine.

12. Process according to claim 1, wherein the alkyl halide is selected from the group consisting of carbon tetrachloride, chloroform, methylene chloride and t-butyl chloride.

13. Process according to claim 1, wherein said polymerization in the presence of said titanium halide and said organic aluminum compound is conducted at a temperature of from 30° to 100° C.

14. Process according to claim 1, wherein said copolymerization is conducted at a temperature of from 30° to 100° C.

15. Process according to claim 1, wherein the molar ration of said organic alumimum compound to titanium halide is from 0.6 to 5.0.

16. Process according to claim 1, wherein the molar ratio of titanium to ethylene or propylene or sum of ethylene or propylene and another α-olefin is from 1/10 to 1/100,000.

* * * * *